US012783896B2

(12) United States Patent
Islam et al.

(10) Patent No.: US 12,783,896 B2
(45) Date of Patent: Nov. 3, 2026

(54) SIGNAL SOURCE FRAMEWORK FOR USER RISK MITIGATION

(71) Applicant: OKTA, INC., San Francisco, CA (US)

(72) Inventors: Tanvir Islam, Lake Stevens, WA (US); Vinayak Shenoy, Seattle, WA (US); Christopher Joseph Camisa, Brooklyn, NY (US); RaghuRam Pamidimarri, Union City, CA (US); Jinlong Fu, Oakville (CA)

( * ) Notice: Subject to any disclaimer, the term of this patent is extended or adjusted under 35 U.S.C. 154(b) by 588 days.

(21) Appl. No.: 18/479,794

(22) Filed: Oct. 2, 2023

(65) Prior Publication Data

US 2025/0111238 A1 Apr. 3, 2025

(51) Int. Cl.

*G06F 21/00* (2013.01)
*G06F 9/54* (2006.01)
*G06N 3/091* (2023.01)

(52) U.S. Cl.

CPC ............... *G06N 3/091* (2023.01); *G06F 9/54* (2013.01)

(58) Field of Classification Search

CPC .......... G06N 3/091; G06N 20/00; G06F 9/54; G06F 21/577; G06F 21/00; H04L 63/1425; H04L 43/04; H04L 43/065

See application file for complete search history.

(56) References Cited

U.S. PATENT DOCUMENTS

| | | | | |
|---|---|---|---|---|
| 12,287,876 | B1 * | 4/2025 | Kim | G06F 21/554 |
| 12,437,192 | B1 * | 10/2025 | Neagu | G06F 9/542 |
| 12,455,963 | B1 * | 10/2025 | Erlich | G06F 21/554 |
| 2021/0258321 | A1 * | 8/2021 | Vegulla | G06N 5/04 |
| 2023/0044695 | A1 * | 2/2023 | Brandy | G06N 20/00 |

* cited by examiner

*Primary Examiner* — William A Corum, Jr.
(74) *Attorney, Agent, or Firm* — Holland & Hart LLP

(57) ABSTRACT

An identity management system may obtain a set of data signals via a system log application programming interface (API). The set of data signals may be associated with interactions between a user of a client device and one or more applications associated with the identity management system. The identity management system may then output a set of text strings that include parsed data from the set of data signals to a large language model (LLM) that is affiliated with a multi-modal machine learning model configured to generate risk metrics based on data signals. A first risk metric may then be obtained from the LLM. Further, the identity management system may generate a second risk metric by using a risk combinator of the multi-modal machine learning model. As such, the identity management system may generate a unified risk metric based on the first risk metric and the second risk metric.

17 Claims, 8 Drawing Sheets

SIGNAL SOURCE FRAMEWORK FOR USER RISK MITIGATION

FIELD OF TECHNOLOGY

The present disclosure relates generally to identity management, and more specifically to a signal source framework for user risk mitigation.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

In some cases, an attacker or unauthorized user may impersonate other legitimate users to gain access to the identity management system and perform fraudulent actions (e.g., phishing, spam, hacking). For larger identity management systems with thousands of user accounts, detecting and/or preventing illegitimate users and malicious account activity can be difficult, error-prone, and time-consuming.

SUMMARY

A method for risk metric generation is described. The method may include: obtaining, via a system log application programming interface (API) of an identity management system (also referred to as syslog), a set of data signals associated with interactions between a user of a client device and one or more applications associated with the identity management system; outputting, to at least one large language model (LLM) affiliated with a multi-modal machine learning model that is configured to generate risk metrics based on data signals captured via the system log API of the identity management system, a set of text strings including parsed data from the set of data signals obtained via the system log API; obtaining, from the at least one LLM affiliated with the multi-modal machine learning model, a first risk metric associated with the interactions between the user of the client device and the one or more applications associated with the identity management system; generating, by a risk combinator of the multi-modal machine learning model, at least one second risk metric associated with the client device; and generating, by the identity management system, a unified risk metric associated with the user of the client device based on the first risk metric obtained from the at least one LLM and the at least one second risk metric generated by the risk combinator.

An apparatus for risk metric generation is described. The apparatus may include one or more memories storing processor-executable code, and one or more processors coupled with the one or more memories. The one or more processors may be individually or collectively operable to execute the code to cause the apparatus to: obtain, via a system log API of an identity management system, a set of data signals associated with interactions between a user of a client device and one or more applications associated with the identity management system; output, to at least one LLM affiliated with a multi-modal machine learning model that is configured to generate risk metrics based on data signals captured via the system log API of the identity management system, a set of text strings including parsed data from the set of data signals obtained via the system log API; obtain, from the at least one LLM affiliated with the multi-modal machine learning model, a first risk metric associated with the interactions between the user of the client device and the one or more applications associated with the identity management system; generate, by a risk combinator of the multi-modal machine learning model, at least one second risk metric associated with the client device; and generate, by the identity management system, a unified risk metric associated with the user of the client device based on the first risk metric obtained from the at least one LLM and the at least one second risk metric generated by the risk combinator.

Another apparatus for risk metric generation is described. The apparatus may include: means for obtaining, via a system log API of an identity management system, a set of data signals associated with interactions between a user of a client device and one or more applications associated with the identity management system; means for outputting, to at least one LLM affiliated with a multi-modal machine learning model that is configured to generate risk metrics based on data signals captured via the system log API of the identity management system, a set of text strings including parsed data from the set of data signals obtained via the system log API; means for obtaining, from the at least one LLM affiliated with the multi-modal machine learning model, a first risk metric associated with the interactions between the user of the client device and the one or more applications associated with the identity management system; means for generating, by a risk combinator of the multi-modal machine learning model, at least one second risk metric associated with the client device; and means for generating, by the identity management system, a unified risk metric associated with the user of the client device based on the first risk metric obtained from the at least one LLM and the at least one second risk metric generated by the risk combinator.

A non-transitory computer-readable medium storing code for risk metric generation is described. The code may include instructions executable by at least one processor to: obtain, via a system log API of an identity management system, a set of data signals associated with interactions between a user of a client device and one or more applications associated with the identity management system; output, to at least one LLM affiliated with a multi-modal machine learning model that is configured to generate risk metrics based on data signals captured via the system log API of the identity management system, a set of text strings including parsed data from the set of data signals obtained via the system log API; obtain, from the at least one LLM affiliated with the multi-modal machine learning model, a first risk metric associated with the interactions between the user of the client device and the one or more applications associated with the identity management system; generate, by a risk combinator of the multi-modal machine learning model, at least one second risk metric associated with the client device; and generate, by the identity management system, a unified risk metric associated with the user of the client device based on the first risk metric obtained from the at least one LLM and the at least one second risk metric generated by the risk combinator.

Some examples described herein may further include operations, features, means, or instructions for using historical data signals captured by the system log API and auxiliary network security data to train the LLM affiliated with the multi-modal machine learning model, where obtaining the first risk metric may be based on training the LLM.

In some examples described herein, the first risk metric may be based on a geolocation of the user, an Internet Protocol (IP) address of the client device, a user agent, a device identifier of the client device, a device type of the client device, user activity logging data associated with the interactions between the client device and the one or more applications, authentication event data associated with the interactions, fingerprint information associated with the user, system log information captured by the system log API, or any combination thereof.

In some examples described herein, the second risk metric may be based on an operating system of the client device, a sensor configuration of the client device, a set of internet settings associated with the client device, a firewall status of the client device, automatic update settings of the client device, an antivirus setting of the client device, a security center service of the client device, a user account control of the client device, user risk information provided by one or more third-party data sources, or any combination thereof.

In some examples described herein, the set of data signals include first-party data extracted by one or more internal security services and third-party data provided by one or more external security services (ESS).

Some examples described herein may further include operations, features, means, or instructions for computing a normalized Euclidean Distance between a reference vector and a signal vector corresponding to a subset of the set of data signals obtained via the system log API of the identity management system, where the second risk metric includes the normalized Euclidean Distance.

In some examples described herein, the set of data signals include first-party data extracted by one or more internal security services and third-party data provided by one or more ESS.

In some examples described herein, the first risk metric may be based on a sequence of event patterns in the set of text strings containing parsed data from the set of data signals.

In some examples described herein, the set of data signals include real-time event-based data signals ingested via the system log API of the identity management system.

In some examples described herein, generating the unified risk metric may include operations, features, means, or instructions for combining the first risk metric obtained from the at least one LLM with the at least one second risk metric generated by the risk combinator of the multi-modal machine learning model.

Some examples described herein may further include operations, features, means, or instructions for configuring the at least one LLM to perform user risk classification by applying transfer learning to the at least one LLM, where the first risk metric may be a result of the user risk classification.

DETAILED DESCRIPTION

Figure 1:
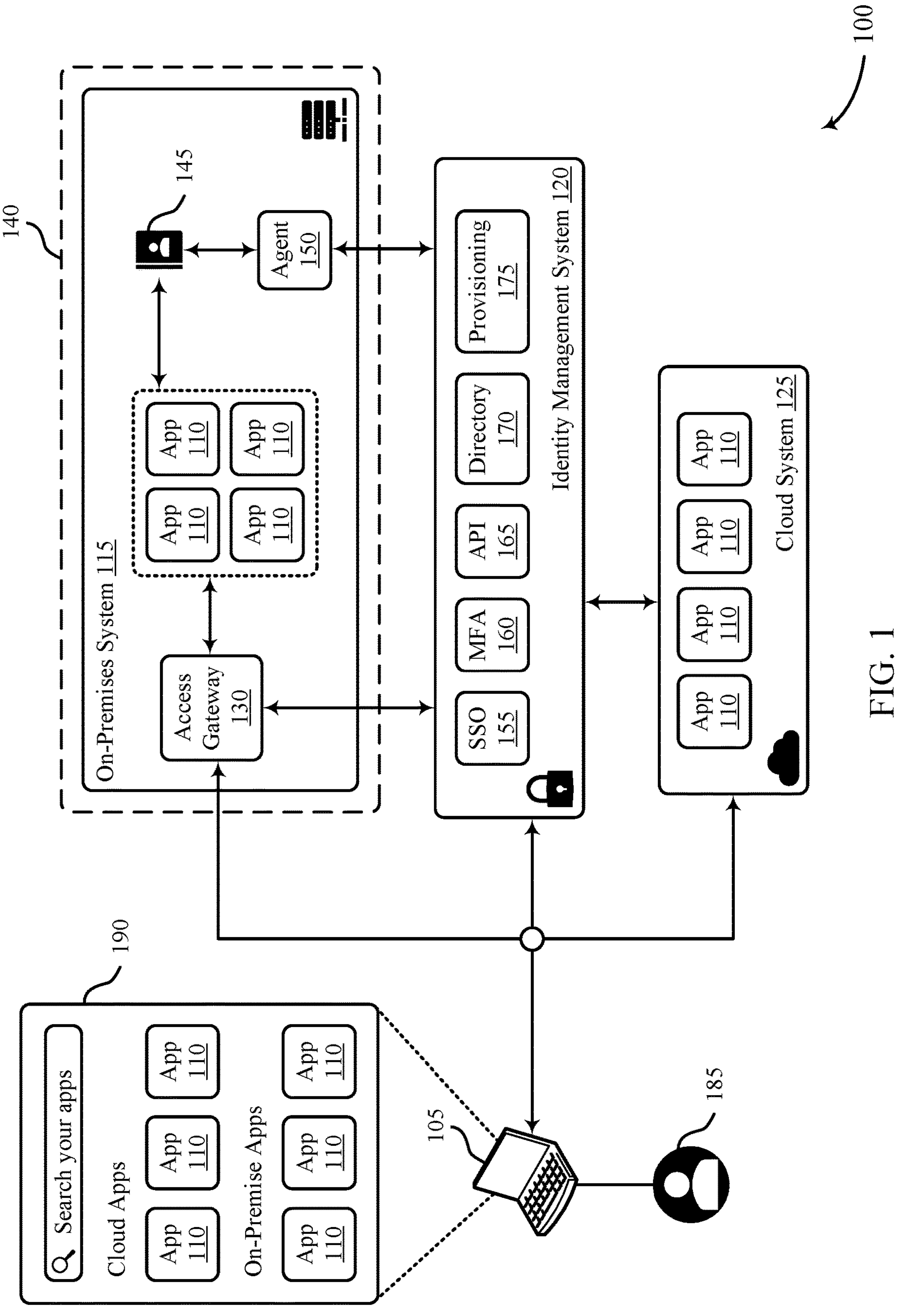
FIG. 1 illustrates an example of a computing system that supports a signal source framework for user risk mitigation in accordance with aspects of the present disclosure.

In some examples, an identity management system may use a system log service, application, or server (collectively referred to as syslog) to track user activity within the identity management system and audit user account access. The syslog may further store and maintain a record of user activity within the identity management system. In some cases, some records stored within the syslog may be associated with bad actors or fraudulent users. That is, users who may use a user's account to perform nefarious activities or fraudulent activities (e.g., spamming, phishing, hacking, or any other type of cyber-attack).

In some examples, the identity management system may receive or obtain a set of data signals associated with one or more interactions between a user of a client device associated with the identity management system and one or more applications associated with the identity management system. That is, the set of data signals may be associated with the activity between a user of a client device and one or more applications. In some cases, the signals may be received via a syslog application programming interface (API) of the identity management system and the set of data signals may be stored within the identity management system. Following, the identity management system may transmit or output a set of text strings to a large language model (LLM) that is affiliated with a multi-modal machine learning model. The set of text strings may include the parsed data from the set of data signals obtained via the syslog API. The LLM may then use the set of text strings to generate a first risk metric for the interactions between the user of the client device and the one or more applications associated with the identity management system. The first risk metric score may indicate whether the respective user associated with the interactions analyzed by the LLM (e.g., analyzed via the set of text strings) is a fraudulent user or bad actor.

For example, if the Internet protocol (IP) address and geolocation data for the client device performing the interaction between the user and the one or more actions may have changed. Thus, the LLM may generate the first risk metric to indicate a probability of the user being a fraudulent user that has gained access to another user's account. The identity management system may also generate at least one second risk metric via a risk combinator of the multi-modal machine learning model of the identity management system. Further, the second risk metric may be associated with the client device and data from third-party applications. The identity management system may then generate a unified risk score for the user of the client device based on the first risk metric generated by the LLM and the second risk metric generated by the risk combinator. Using the unified risk metric, the identity management system may determine whether the risk metric associated with the user satisfies a risk metric threshold or indicates that the user is a fraudulent user. In cases where the identity management system determines that the user of the client device may be a fraudulent user, the identity management system may then perform an action to prevent the fraudulent user from causing any additional harm to the identity management system or other users.

In some examples, the identity management system may train the LLM using previous or historical data signals captured by the syslog API. The LLM may then generate the first risk metric based on the training and the use of data signals received via the syslog API in real-time. The identity management system may also generate the second risk metric based on a distance (e.g., a Euclidean distance) between a vector of a signal from a third-party application (e.g., an application that is unaffiliated with the identity management system) and a reference vector. Further, the identity management system may combine both the first risk metric and the second risk metric to generate the unified risk metric. Additionally, or alternatively, the identity management system may configure the LLM to perform user risk classification by applying transfer learning to the LLM where the first risk metric is a result of the user risk classification.

By using the techniques of the present disclosure, the identity management system may be capable of detecting changes in the activity of a user which can indicate that the user is a fraudulent user. For example, the fraudulent user may be a user who has gained access to a respective user's account and is using the respective user's account to access the user's data, perform fraudulent activities, or any combination thereof. As such, having the identity management system being capable of detecting whether a user may be a fraudulent user early allows the identity management system to perform actions to prevent the fraudulent users from performing any activities that could impact other users associated with the identity management system. Therefore, by generating the risk metrics of users as described by the techniques of the present disclosure, the identity management system may be capable of providing a more secure computing system which may result in an increase in trust and reliability of the computing system.

Aspects of the disclosure are initially described in the context of a computing system. Additional aspects of the disclosure are described with reference to a flowchart, a LLM flowchart, and a process flow. Aspects of the disclosure are further illustrated by and described with reference to apparatus diagrams, system diagrams, and flowcharts that relate to signal source framework for user risk mitigation.

FIG. 1 illustrates an example of a computing system 100 that supports a signal source framework for user risk mitigation in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning, artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

In some examples of the computing system 100, the identity management system 120 may use a syslog server, application, or service to track user 185 activity within the identity management system 120 and audit user 185 account access. The syslog may further store and maintain a record of user 185 activity within the identity management system 120. In some cases, some records stored within the syslog may be associated with bad actors or fraudulent users 185. That is, users 185 who may use a user's 185 account to perform nefarious activities or fraudulent activities. For example, before gaining access to the identity management system 120, a fraudulent user 185 may perform phishing attacks, as described elsewhere herein, to gain access to the identity management system 120. Once a fraudulent user 185 has access to the identity management system 120, the fraudulent user 185 may employ lateral movement tactics. As described herein, lateral movement refers to a type of cyberattack, whereby an attacker uses a compromised user account to move deeper into a network (such as the identity management system 120) in search of sensitive data and other valuable information. After breaching the network, the attacker maintains ongoing access by moving through the compromised environment and obtaining increased privileges using various tools. Thus, after gaining access to the identity management system 120, the fraudulent user 185 may be capable of broadening their access within the identity management system 120 to gain additional information on the identity management system 120 and the users 185 of the identity management system 120.

In some examples, the identity management system 120 may receive or obtain a set of data signals associated with one or more interactions between a user 185 of a computing device 105 (e.g., a client device) associated with the identity management system 120 and one or more applications 110 associated with the identity management system 120. That is, the set of data signals may be associated with the activity between a user 185 of a computing device 105 and one or more applications 110. In some cases, the signals may be received via a syslog API of the identity management system 120 and the set of data signals may be stored within the identity management system 120. Following, the identity management system 120 may transmit or output a set of text strings to a LLM that is affiliated with a multi-modal machine learning model. The set of text strings may include the parsed data from the set of data signals obtained via the syslog API. The LLM may then use the set of text strings to generate a first risk metric for the interactions between the user 185 of the computing device 105 and the one or more applications 110 associated with the identity management system 120. The first risk metric score may indicate whether the respective user 185 associated with the interactions analyzed by the LLM (e.g., analyzed via the set of text strings) is a fraudulent user 185 or a bad actor.

For example, if the IP address and geolocation data for the computing device 105 performing the interaction between the user 185 and the one or more applications 110 may have changed. Thus, the LLM may generate the first risk metric to indicate a probability of the user 185 being a fraudulent user 185 that has gained access to another user's 185 account. The identity management system 120 may also generate at least one second risk metric via a risk combinator of the multi-modal machine learning model of the identity management system 120. Further, the second risk metric may be associated with the computing device 105 and data from third-party applications 110. The identity management system 120 may then generate a unified risk score for the user of the computing device 105 based on the first risk metric generated by the LLM and the second risk metric generated by the risk combinator. Using the unified risk metric, the identity management system 120 may determine whether the risk metric associated with the user 185 satisfies a risk metric threshold or indicates that the user 185 is a fraudulent user 185. In cases where the identity management system 120 determines that the user 185 of the computing device 105 may be a fraudulent user 185 the identity management system 120 may perform an action to prevent the fraudulent user 185 from causing any additional harm to the identity management system 120 or other users 185.

In some examples, the identity management system 120 may train the LLM using previous or historical data signals captured by the syslog API and the LLM may generate the first risk metric based on the training and the use of data signals received via the syslog API in real-time. The identity management system 120 may also generate the second risk metric based on a distance (e.g., a Euclidean distance) between a vector of a signal from a third-party application 110 (e.g., a mobile device management (MDM) service affiliated with the identity management system) and a reference vector. Further, the identity management system 120 may combine both the first risk metric and the second risk metric to generate the unified risk metric. Additionally, or alternatively, the identity management system 120 may configure the LLM to perform user 185 risk classification by applying transfer learning to the LLM where the first risk metric is a result of the user 185 risk classification.

As such, by using the techniques of the present disclosure, the identity management system 120 may be capable of detecting changes in the activity of a user 185 which can indicate that the user 185 is a fraudulent user 185. Further, the techniques of the present disclosure may enable the identity management system 120 to detect such changes soon after the fraudulent user gains access to the identity management system or before the fraudulent user gains full access into the identity management system 120. As such, having the identity management system 120 being capable of detecting whether a user 185 may be a fraudulent user 185 early may enable the identity management system 120 to perform actions to prevent the fraudulent users 185 from performing any activities that could impact other users 185 associated with the identity management system. Therefore, by generating the risk metrics of users as described by the techniques of the present disclosure, the identity management system 120 may be capable of ensuring that the computing system 100 is secure which may result in an increase in trust and reliability of the computing system 100.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

Figure 2:
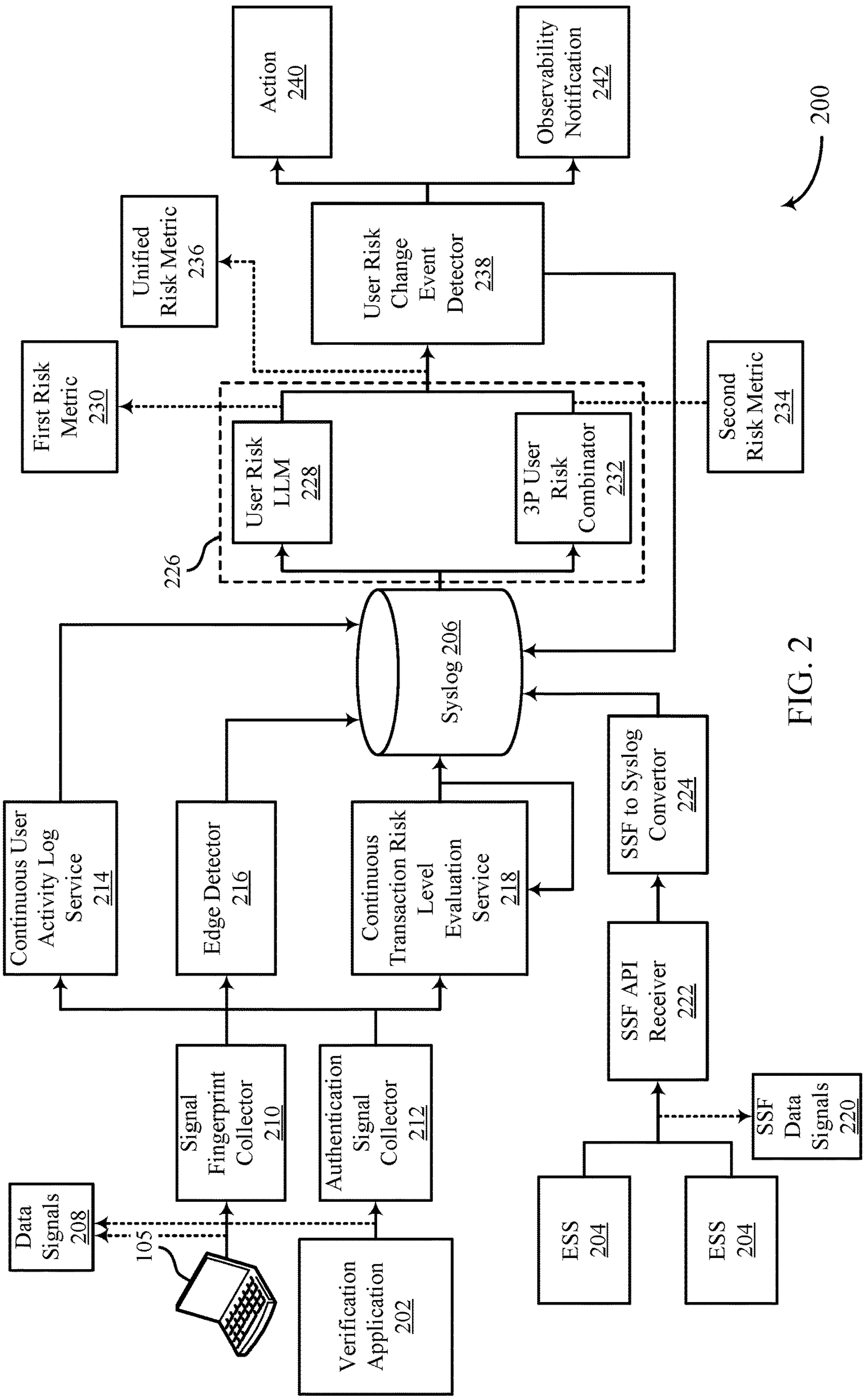
FIG. 2 shows an example of an identity management system diagram that supports a signal source framework for user risk mitigation in accordance with aspects of the present disclosure.

FIG. 2 shows an example of an identity management system diagram 200 that supports a signal source framework for user risk mitigation in accordance with aspects of the present disclosure. In some examples, the identity management system diagram 200 may implement one or more aspects of the computing system 100. For example, the identity management system diagram 200 may include a computing device 105, an verification application 202, external security services (ESS) services 204 (such as Jamf or Netskope), and a syslog service 206 (also referred to as a system log API), which may be examples of devices and services described with reference to FIG. 1. In some examples, the ESS 204 may be an example of MDM services (e.g., Jamf or Netskope), antivirus software, network security services (e.g., Windows Security Center or Crowdstrike), an internet browsers (e.g., Microsoft Edge, Google Chrome, Safari, Mozilla Firefox, or any combination thereof) security risk detection system, or any combination thereof. Further, the identity management system diagram 200 may be implemented by an identity management system 120, as described with reference to FIG. 1.

For the identity management system 120 to receive a set of data signals 208 from a syslog API, one or more data signals 208 may be collected from both the computing device 105 via a native base fingerprint collector 210 and the verification application 202 via an authentication signal collector 212. In some cases, the computing device 105 and the verification application 202 may both be associated with and/or connected with the identity management system 120. In some examples, the native base fingerprint collector 210 may collect one or more data signals 208 from the computing device 105 that are fingerprinted with information. For example, a respective data signal 208 may include a digital fingerprint or signature. A digital fingerprint may be a technique used to identify and track a data signal 208. For example, the digital fingerprint of a data signal 208 may include a geolocation of a user, an IP address of the computing device 105, a user agent, a device type of the computing device 105 (e.g., a mobile device, a laptop, a desktop), or any combination thereof. Further, the digital fingerprint of a data signal 208 may include a unique identifier which is hashed by the computing device 105 (e.g., a hash function is performed to generate a unique fingerprint).

In some other examples, the authentication signal collector 212 may collect one or more data signals 208 from the verification application 202. The authentication signal collector 212 may assign a device identifier to a device that sends a data signal 208 and determine if a device sending the data signal 208 has been altered in any way. For example, the authentication signal collector 212 may determine that a device is jailbroken. Jailbreaking a device may refer to a process of a user removing software restrictions on the device imposed by the manufacturer of the device to gain a higher level of access to the device e.g., a root or administrator access). In some cases, users may use the jailbroken device to perform fraudulent, nefarious, or malicious activities based on having a higher level of access to the device allowing the user to have an increase in flexibility and manipulation over the software (e.g., the operating system) of the device.

The one or more data signals 208 obtained from the computing device 105 and the verification application 202 and collected via the native base fingerprint collector 210 and the authentication signal collector 212 respectively may then be analyzed by the identity management system 120 and stored within the syslog service 206. In some cases, the syslog service 206 may include a server, a database, a cloud storage platform, or any combination thereof. The identity management system 120 may use the syslog service 206 to store syslog messages and event notifications for an identity management system. As such, the identity management system 120 may analyze the one or more data signals 208 obtained via the native base fingerprint collector 210 and the authentication signal collector 212 using a continuous user activity log service 214, an edge detector 216, and a continuous transaction risk level evaluation service 218. In some cases, the continuous user activity log service 214, the edge detector 216, and the continuous transaction risk level evaluation service 218 may be components or services of the identity management system 120, connected to the identity management system 120, associated with the identity management system 120, or any combination thereof.

In some examples, the continuous user activity log service 214 may use the one or more data signals 208 and determine the applications a user is visiting, the time the user is visiting the applications, and if the user successfully accessed the applications. Further, to determine whether a user successfully accessed an application, the continuous user activity log service 214 may determine whether an authentication procedure was successful. In some cases, if the authentication procedure was unsuccessful, the continuous user activity log service 214 may count a quantity of unsuccessful authentication attempts. As such, if the quantity of unsuccessful authentication attempts satisfies a threshold quantity of unsuccessful authentication attempts, the continuous user activity log service 214 may indicate that the user associated with the unsuccessful authentication attempts may be a fraudulent user.

The edge detector 216 may be able to detect if there is a change between data signals. For example, some of the data signals associated with a user may be associated with a first IP address and the remaining data signals may be associated with a second IP address. As such, the edge detector 216 may detect that there is a change in the IP address being used by a user which may indicate fraudulent activity by the user. The edge detector 216 may also determine if there is a change in any other parameters associated with the user. For example, the edge detector 216 may detect a change in the device being used by the user within the same session (e.g., a time period which the authentication of the user is valid for).

The identity management system 120 may also use the continuous transaction risk level evaluation service 218 to detect if any of the parameters of a data signal are new. For example, the continuous transaction risk level evaluation service 218 may determine that a respective data signal may be associated with an IP address that has not previously been associated with the user, or the respective data signal may have a geolocation of a different country than the country associated with the user. Such parameter changes may indicate that a different user has access and is using an account of a user. For example, a first user may own an account and may be associated with the identity management system. In some cases, a second user that is different from the first user may gain access to the account of the first user which would allow the second user to access the data of the first user and act on behalf of the first user while refraining from receiving permission or consent from the first user to do so. Additionally, or alternatively, the continuous transaction risk level evaluation service 218 may operate on the same signals multiple times to detect each new parameter of a respective data signal 208. As such, the identity management system 120 may execute the continuous transaction risk level evaluation service 218 until a flag is indicated or until the continuous transaction risk level evaluation service 218 fails to return a result.

The identity management system 120 may store such indications by the continuous user activity log service 214, edge detector 216, and continuous transaction risk level evaluation service 218 for a respective data signal 208 along with the respective data signal 208 within the syslog service 206 as syslog events or messages. In some examples, the syslog service 206 may also receive and store syslog events or messages from the ESS204. For example, the identity management system 120 may receive shared signal framework (SSF) data signals 220 via an SSF API receiver 222. As such, the SSF API receiver 222 may receive one or more SSF data signals 220 via an SSF API from one or more ESS 204 associated with the user. In some examples, the SSF data signals 220 may be indicative of events, conditions, or actions corresponding to interactions between a user of a computing device 105 and the ESS 204. However, the SSF data signals 220 may be in a different format than the data signals 208 received from the computing device 105 and the verification application 202. As such, to store the SSF data signals 220 in the syslog service 206, the identity management system 120 may use an SSF to syslog convertor 224 to convert the SSF data signals 220 into the format of a syslog message or the format of syslog event data.

Using the set of data signals 208 and the converted set of SSF data signals 220 stored within the syslog service 206, the identity management system 120 may output the signals to a multi-modal machine learning model 226. The multi-modal machine learning model 226 may include an LLM 228 which generates a first risk metric 230 and a user risk combinator 232 which generates a second risk metric 234. In some examples, the multi-modal machine learning model 226 may be separate from the identity management system 120. In some other examples, the multi-modal machine learning model 226 may be a part of, connected to, or associated with the identity management system 120. Further, the identity management system may use the first risk metric 230 and the second risk metric 234 to generate a unified risk metric 236, which may provide a more accurate indication of the risk or probability of the respective user associated with the data signals 208 and the SSF data signals 220 being a fraudulent user.

In some cases, the unified risk metric 236 may be more accurate than the first risk metric 230 or the second risk metric 234. For example, the identity management system 120 may use signals (e.g., the one or more data signals 208 and the SSF data signals 220) from both applications and devices connected to (e.g., the computing device 105 and the verification application 202) and separate from (e.g., the ESS 204) the identity management system 120. As such, by using a wide variety and diversity of signals, the identity management system 120 may provide a more accurate risk metric for a respective user (e.g., the unified risk metric 236).

Further, the LLM 228 may be an example of a type of machine learning model used by the multi-modal machine learning model 226. In some examples, LLMs (e.g., the LLM 228) may be a type of machine learning model used by an AI system (e.g., a generative AI system) to process a relatively large quantity of text data, images, videos, or any combination thereof. In some examples, a corpus of data (e.g., a relatively large set) may be given to the LLM 228 as training data, the AI system of the LLM 228 may perform web-scraping to extract large amounts of data from the internet, and/or a small amount of data may be given to the LLM 228 as training data to instruct the AI system of type of data the AI system should extract via web-scraping techniques. The data may be stored within a database system or unstructured data storage. In some cases, the data may then be accessed by the LLM to perform text-based predictions. Further descriptions on the functions and training of the LLM 228 may be described with reference to FIG. 3.

In some examples, the identity management system 120 may configure the LLM 228 to perform user risk classification by applying transfer learning to the LLM 228. Transfer learning may be a machine learning technique that is based on training a machine learning model to perform a first task and then adapting the machine learning model to be reused for a different and related second task. For example, the identity management system 120 may be preconfigured with the multi-modal machine learning model 226 and the LLM 228 which may be a pre-trained machine learning model that was trained on a corpus of source data (e.g., a relatively large dataset). By training the LLM 228 on the corpus of source data, the LLM 228 may have a relatively broad understanding of data and language which may assist with any retraining of the LLM 228.

Therefore, to train the LLM 228 to be used for user risk classifications, the LLM 228 may be retrained using a corpus of target data (e.g., a dataset of syslog event data). In such cases, the LLM 228 may use the contextual understanding of data and language learned from the pretraining on the corpus of source data while being retrained for the purpose of performing user risk classification. In some cases, the adoption process of the LLM 228 may also be referred to as fine-tuning. As such, a new layer may be added to the LLM 228 to determine classification of the syslog text to determine if a user is potentially a risk (e.g., if the user is potentially a fraudulent user) at a given time (e.g., at a time of execution of the LLM 228 which may be triggered by a request from the identity management system).

Thus, the identity management system 120 may use the one or more data signals 208 from computing device 105 and verification application 202 that are stored within the syslog service 206 as an input for the LLM 228. As such, the LLM 228 may be capable of performing AI-based detection of user risk which may be powered by the LLM 228. In some examples, the data used as the input for the LLM 228 may be a set of text strings associated with the one or more data signals 208 from computing device 105 and verification application 202. For example, before providing the input the LLM 228, the identity management system may parse the one or more data signals 208 into a set of text strings. Such parsing operation may be described elsewhere herein including with reference to FIG. 3.

As such, the identity management system 120 may use the data associated with the one or more data signals 208 which are indicative of one or more interactions between a user and one or more applications as an input to the LLM 228 to generate the first risk metric 230. The first risk metric 230 may then be provided back to the identity management system 120 as the output of the LLM 228. In some examples, the first risk metric 230 may indicate a score of the risk of the user being a fraudulent user. In some cases, the score indicated via the first risk metric 230 may be indicative of a probability of the user being a fraudulent user. Further, the score may be normalized to be between 0 and 1 where a value of 0 indicates that the user is not a fraudulent user and a value of 1 indicates that the user is a fraudulent user. As such, the higher the value of the score, the more likely or probable that the user may be a fraudulent user and may be a risk to other users associated with the identity management system 120.

In some examples, the multi-modal machine learning model 226 may also use the user risk combinator 232 to generate the second risk metric 234. The user risk combinator 232 may combine and integrate the converted SSF data signals 220 to generate the second risk metric 234. In some cases, the multi-modal machine learning model 226 may generate the second risk metric 234 using the converted SSF data signals 220, however, simply using the converted SSF data signals 220 to generate the second risk metric 234 is inefficient as the converted SSF data signals 220 may be noisy. For example, a basic heuristic of a first SSF data signal 220 with a value less than 0.6 (e.g., <0.6) or any of a second SSF data signals with a value of "POOR" may yield a 1.63% detection rate (e.g., 1,630 per every 100,000 samples) which may be relatively high. Further, the SSF API receiver 222 may receive the SSF data signals 220 from one or more different ESS 204, and thus may be configured with different scores and scoring methods. For example, a first ESS 204 may provide a score with a value between 0 and 1 (e.g., analog scores) and a second ESS 204 may provide a score with "good" and "poor" attributes (e.g., binary scores). As such, the identity management system 120 may use the user risk combinator 232 of the multi-modal machine learning model 226 to combine and normalize the user risk metrics and scores from different ESS 204.

The user risk combinator 232 may combine the SSF data signals 220 from the different ESS 204, while refraining from gaining any additional information and to generate a single user risk score (e.g., the second risk metric 234). In some examples, the user risk combinator 232 may generate the second risk metric 234 based on a Euclidean distance computation. The Euclidean Distance computation may compare a vector of a respective SSF data signal 220 from an ESS 204 against a reference vector to determine how far the respective SSF data signal 220 is from a reference signal represented by the reference vector. For example, for a first vector a and a second vector b with values that are elements of a list of n real numbers (e.g., For two vectors a, b E R"), the Euclidean distance may be the squared root of the sum of the squared difference of the first vector and the second vector as illustrated in Equation 1.

$$\|a-b\|_2^2=\sum_{i=1}^{n}(a_i-b_i)^2 \quad (1)$$

As such, for a vector a with the values of 1, 2, and 4 (e.g., a=(1,2,4)) and for a vector b with the values of 0, 1, and 2 (e.g., b=(0,1,2)) the Euclidean distance would be equal to 6 as illustrated below.

$$\|a-b\|_2^2=(1-0)^2+(2-1)^2+(4-2)^2=6$$

Therefore, based on calculating the Euclidean distance between a vector representative of a SSF data signal 220 and a reference vector representative of a reference signal. Further, the procedure of the user risk combinator 232 may include encoding the featured of the SSF data signals 220 and the computing the Euclidean distance and normalizing the result (e.g., normalizing the Euclidean distance result to a value between 0 and 1) to generate the second risk metric 234.

Upon the identity management system 120 receiving first risk metric 230 from the LLM 228 and generating the second risk metric 234 via the user risk combinator 232, the identity management system 120 may generate a unified risk metric 236. The unified risk metric 236 may be a risk metric associated with the user associated with the one or more data signals 208 and the SSF data signals 220. Further, the unified risk metric 236 may be based on the first risk metric 230 generated by the LLM 228 and the second risk metric 234 generated by the user risk combinator 232. For example, the identity management system 120 may combine the first risk metric 230 and the second risk metric 234 generated from the LLM 228 and the user risk combinator 232 of the multi-modal machine learning model 226 respectively to generate the unified risk metric 236.

As such, the identity management system 120 may input the unified risk metric 236 into a user risk change event detector 238 to determine if the unified risk metric 236 for a respective user indicates that the respective user is a fraudulent user. For example, the user risk change event detector 238 may determine whether the unified risk metric 236 satisfies a risk metric threshold. Further, if the unified risk metric 236 satisfies or exceeds the risk metric threshold, the user risk change event detector 238 of the identity management system 120 may determine that the respective user is a fraudulent user. In some examples, the result of the user risk change event detector 238 determination may result in a payload being stored within the syslog service 206. The payload may indicate a risk level (e.g., based on the unified risk metric 236), a detection type, and a reason. In some cases, the identity management system 120 may store the payload result of the user risk change event detector 238 with an identifier of a respective user (e.g., a user identifier) within the syslog service 206. As such, as the identity management system 120 receives additional data signals 208 and SSF data signals 220, the identity management system 120 may be capable of detecting whether a user is a fraudulent user if the user is logged as a fraudulent user within the syslog service 206.

After the identity management system 120 determines a respective user may be a fraudulent user based on the unified risk metric 236, the identity management system 120 may perform one or more actions 240. In some examples, the actions 240 may include the identity management system 120 performing a universal logout for a respective user based on the respective user being determined to be a fraudulent user. For example, a first user may be a fraudulent user by using an account owned by a second user. To prevent the first user (e.g., the fraudulent user) from continuing to access and use the account of the second user the identity management system 120 may log the first user out of the account of the second user via a universal log out procedure. Further, the identity management system 120 may perform the universal logout for the first user based on determining that the unified risk metric 236 of the first user.

In some examples, users of the identity management system 120 may provide credentials to access the one or more applications associated with the identity management system 120 via a SSO service. As such, the universal logout may revoke a user's access to each application associated with the identity management system 120 to ensure that a fraudulent user's access is completely revoked. In some cases, as an enhanced security measure, when the identity management system 120 performs a universal logout for a user the identity management system 120 may trigger the user to change a password for access to the identity management system 120.

Further, in some cases, after the identity management system 120 determines a respective user may be a fraudulent user based on the unified risk metric 236, an observability notification 242 may be triggered. The observability notification 242 may include the identity management system 120 transmitting or notifying an administrative user of the identity management system 120 of the fraudulent activity associated with a respective user's account. For example, an administrative user of the identity management system 120 may have access to a user interface of the identity management system 120 that includes a dashboard of the identity management system 120. The administrative user may use the dashboard of the identity management system 120 to configure the security protocols of the identity management system 120 and manage the users and applications associated with the identity management system 120. As such, the administrative user may receive the observability notification 242 from the identity management system 120 based on the unified risk metric 236 indicating that a fraudulent user has been detected by the multi-modal machine learning model 226 and the user risk change event detector 238. In some examples, the identity management system 120 may automatically perform the one or more actions 240 or administrative user may trigger the identity management system 120 to perform the one or more actions 240 based on receiving the observability notification 242

In some cases, the administrative user may receive the observability notification 242 and may contact the user for verification. For example, if the identity management system 120 determines an activity is fraudulent based on a change in geolocation, the administrative user may contact the user to verify the change in geolocation. Based on the response from the user, the administrative user may configure the identity management system 120 to perform the one or more actions 240 (e.g., the universal logout, trigger the password change). For example, if the user responds and indicates that the geolocation is not the current location of the user, the administrative user of the identity management system 120 may trigger the identity management system 120 to may perform, or the identity management system 120 may automatically perform a universal logout and trigger the user to change their password. In some cases, the administrative user may determine that the user should be re-onboarded to gain access to the identity management system 120 again. In some other cases, before allowing the user to regain access to the identity management system 120, the administrative user may require proof of the identity from the user to verify that the identity the user is claiming to be is the actual identity of the user. For example, the administrative user may prompt the user with one or more security questions to verify the identity of the user.

In some other cases, after the administrative user receives the observability notification 242, the administrative user may configure a more secure set of security requirements for user access to the identity management system 120. For example, the administrative user may implement an MFA service to access an account of the identity management system 120, implement stricter password requirements (e.g., minimum quantity of characters, addition of special characters, requiring lower case and upper case letters), and may change the lifespan of a user's credentials. The lifespan of a user's credentials may refer to a length of time a password is valid until the user would be triggered to change the password to access the identity management system 120 (e.g., every x amount of months, every quarter, every six months, once a year).

As such, the identity management system may use the components illustrated in the identity management system diagram 200 and described herein to use the multi-modal machine learning model 226 to generate the unified risk metric 236 to determine the risk level of a respective user. Further, determining the risk level may assist the identity management system 120 in determining whether a respective user is a fraudulent user. As such, the techniques of the present disclosure may enhance the security of the identity management system 120 thereby resulting in an increase in trust and reliability of the identity management system 120. Further description of the techniques of the present disclosure including the training and operation of the LLM 228 of the multi-modal machine learning model 226 used to generate the first risk metric 230 for the generation of the unified risk metric 236 may be described elsewhere herein including with reference to FIGS. 3 and 4.

Figure 3:
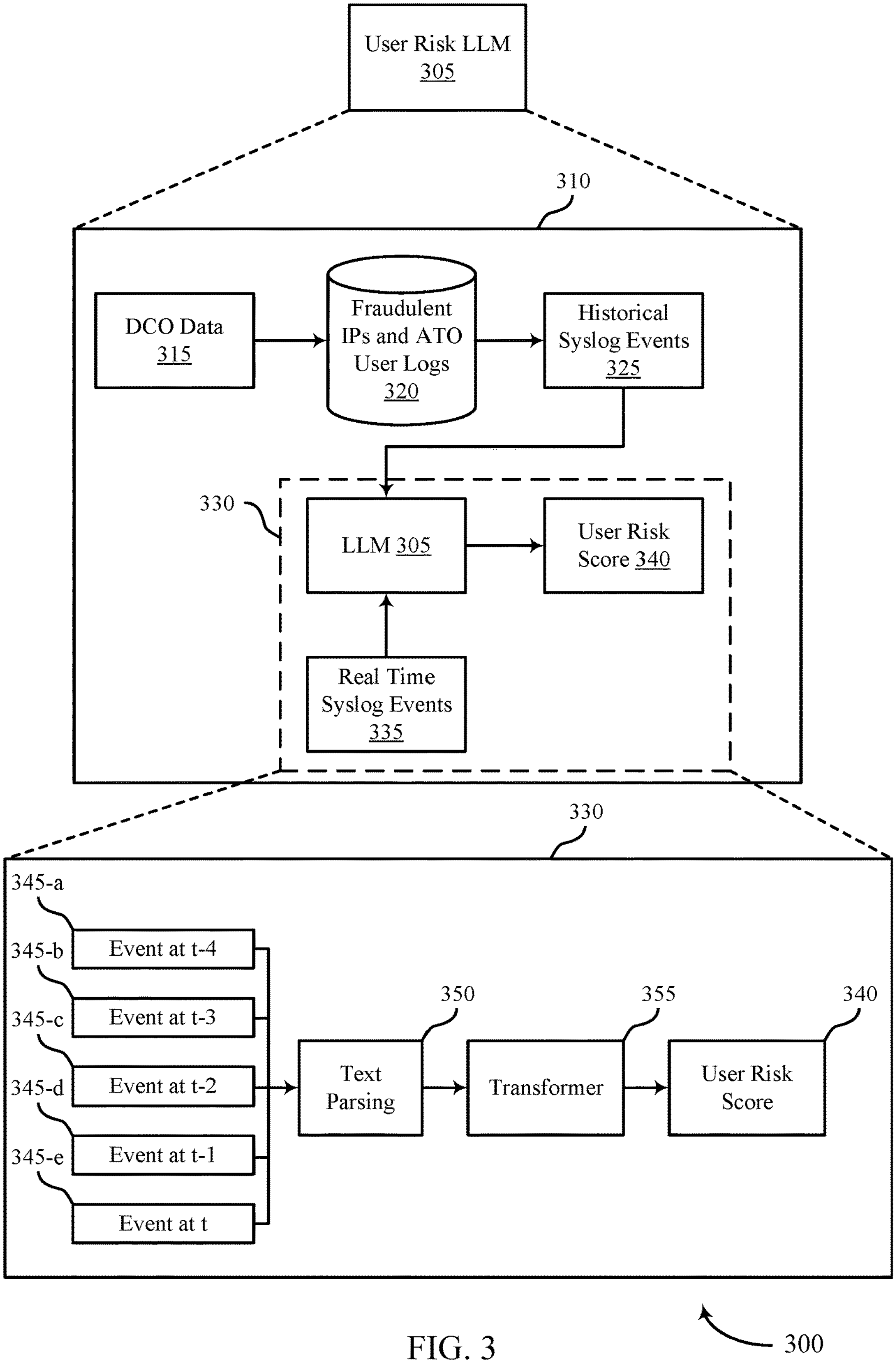
FIG. 3 shows an example of a large language model (LLM) diagram that supports a signal source framework for user risk mitigation in accordance with aspects of the present disclosure.

FIG. 3 shows an example of a LLM diagram 300 that supports a signal source framework for user risk mitigation in accordance with aspects of the present disclosure. In some examples, the LLM diagram 300 may be implemented by or may implement the computing system 100 or the identity management system diagram 200. For example, the LLM diagram 300 may include a LLM 305, which may be examples of devices and services described with reference to FIGS. 1 and 2.

In some examples, the LLM 305 may undergo a training procedure 310. In some cases, the training procedure 310 may utilize supervised learning techniques. For example, as part of the training procedure 310, the LLM 305 may receive training data from the identity management system 120 that is processed and categorized by a user of the identity management system 120. The LLM 305 may then use the training data to recognize patterns to be used when receiving input data. As such, when using the LLM 305 for user risk classification, the LLM 305 may determine a level of user risk that is acceptable and a level that may indicate a fraudulent user as described herein.

As part of the training procedure 310, the LLM 305 may be trained using defensive cyber operation (DCO) data 315. The DCO data 315 may be used to detect and respond to cyber threats or attacks within the identity management system 120. For example, the DCO data 315 (also referred to herein as auxiliary network security data) may include fraudulent IPs and account takeover (ATO) user logs 320 identified by the identity management system 120, syslog data associated with compromised user accounts, etc. Further, it should be understood that the fraudulent IPs and ATO user logs 320 may include IP addresses and ATO user logs associated with any type of cyberattack described herein. As part of the training procedure 310, the LLM 305 may utilize the DCO data 315 for identifying phishing infrastructure (e.g., the infrastructure or format of phishing activities). As described herein, phishing is a form of cyber-attack where someone pretends to be another user, brand, or company that a user may trust. For example, as described herein, the phishing may involve a fraudulent user gaining access to a user's account and using the account that is trusted by other users to gain access to an organizations data, among other nefarious acts. The DCO data 315 may also be capable of identifying organization and user ATOs. The ATOs may be a form of identity attack where a fraudulent user gains unauthorized access to an account using one or more cyber-attack techniques (e.g., credential stuffing, phishing, session hijacking) to access a user's account and the data of the user's account.

Credential stuffing is when a fraudulent user attempts to use user credentials from a list of compromised user credentials to gain access to the identity management system 120. In some other examples, to perform an ATO, a fraudulent user may perform a session hijacking procedure. A session hijacking procedure may include a connection that is supposed to be being used between a user and the identity management system 120 being hijacked by a fraudulent user. For example, a client device and the identity management system 120 may form a connection via a handshake procedure. As there may be multiple connections between the identity management system 120 and client devices, messages exchanged between a client device and the identity management system 120 may include information associated with a respective connection (e.g., a source IP address, a destination IP address, a source port number, and a destination port number). In some examples, an attacker may spoof a message to have the information of a respective connection between a client device and the identity management system 120 and transmit the spoofed message to the identity management system 120. As the attacker may have the correct information, the identity management system 120 may be unable to determine that the spoofed message is from the attacker opposed to from the user associated with the connection. As such, the attacker or fraudulent user may gain access to the connection and may be capable of redirecting the connection directly to the fraudulent user to gain complete access to a user's account.

To prevent such attacks, the DCO data 315 may include IP addresses associated with fraudulent activity (e.g., phishing, session hijacking) through using a uniform resource locator (URL) scanner and by searching through logs directly for a specific signal associated with an infrastructure of for a type of cyber-attack. For example, the identity management system 120 may search through records of as user's activity and behavior, usage (e.g., the applications being accessed, the devices being used), and transactions. In some cases, based on the DCO data 315, the identity management system 120 may identify a type of cyber-attack by determining a specific phishing service being used. For example, phishing may occur as a result of phishing as a service, where a software as a service business provides access to a phishing kit in exchange for a monetary fee. Phishing as a service business may be able to register a large quantity of email accounts (e.g., upwards of ten thousand) per day, and then sell them to phishers for a profit. However, some phishing as a service may provide phishing kits that have similar patterns that can be identified by the identity management system 120. As such, the identity management system 120 may recognize such patterns and use the patterns as part of the training procedure 310 of the LLM 305.

Using the fraudulent IPs and ATO user logs 320, the DCO data 315 may also tag the user associated with a respective fraudulent IP and/or ATO user log 320. However, in some cases, such tagging may be performed via a manual review process which can have a relatively long delay between the detection and an action. In some examples, such detection after the training procedure 310 may become automated and can allow the LLM 305 to automatically detect respective users associated with phishing or other fraudulent activities. Further, by automating the detection, the identity management system 120 may be capable of providing a process that reduces the latency of the detection to a consistent latency. In some cases, such latency may be relatively small such that the LLM 305 can perform the detections in real-time or near real-time. Additionally, or alternatively, as the DCO data 315 may detect types of phishing infrastructures being used by fraudulent users, the LLM 305 may learn the patterns of the phishing infrastructures. For example, a phishing infrastructure may be associated with a unique signal behavior and the LLM 305 may be capable of learning the behavior to more accurately detect the phishing. In some examples, the LLM 305 may also learn or detect similar patterns across multiple different types of phishing infrastructures. As such, the LLM 305 may be capable of detecting additional phishing infrastructures. For example, fraudulent users (e.g., threat or bad actors) may refrain from using the same phishing infrastructures for additional phishing attacks. In such cases, the LLM 305 may be capable of detecting the different phishing infrastructures that were not available in the DCO data 315 during the training procedure 310 based on detecting patterns across the types of phishing infrastructures.

Further, as part of the training procedure 310, the identity management system 120 may use a set of historical syslog events 325 to train the LLM 305. The set of historical syslog events 325 may include one or more historical data signals captured by the identity management system 120 via a syslog API. Additionally, or alternatively, the LLM 305 may also be trained using auxiliary network security data. As such, the training procedure 310 of the LLM 305 may provide the LLM 305 data to detect and learn patterns of fraudulent users within the set of historical syslog events 325. Using the learned patterns, during an execution phase 330, the LLM 305 may receive real-time syslog events 335 which the LLM 305 can use to determine a user risk score 340 for a respective user. For example, the LLM 305 may detect one of the phishing infrastructure types used to train the LLM 305 is present within the real-time syslog events 335. As such, the LLM 305 may determine that the respective user associated with the real-time syslog events 335 with the detected phishing infrastructure type is a fraudulent user. Such determination may be in the form of the user risk score 340 where a higher score is indicative of a higher risk associated with a respective user.

In some examples, the LLM 305 may benefit from the understanding of the sequential patterns of syslog events as learned and trained in the training procedure 310 via receiving the set of historical syslog events 325. For example, an authentication syslog event (e.g., user.authentication.sso) may come after a session start syslog event (e.g., user.session.start). As such, if the LLM 305 receives an authentication syslog event before a session start syslog event in the real-time syslog events 335, the LLM 305 can determine that the syslog events are out of order which may be indicative of the respective user being associated with fraudulent activities. Further, the LLM 305 may also learn the behavior of a non-fraudulent user via the set of historical syslog events 325. As such, when the behavior of a user associated with the real-time syslog events 335 differs from the expected behavior of a user, the LLM 305 may output a higher value within the user risk score 340. Moreover, the LLM 305 may also store and memorize malicious signals seen in the training data from the DCO data 315 or that are detected in the execution phase 330 of the LLM 305. As such, the LLM 305 may continuously be retrained by receiving the real-time syslog events 335 and storing the additional patterns, infrastructures, and techniques used by fraudulent users that the LLM 305 detects.

In some examples, the LLM 305 may be configured to receive text data as an input. As such, the LLM 305 may be unable to determine the user risk score 340 directly from the real-time syslog events 335 received within the execution phase 330. As such, the execution phase 330 may also include the identity management system 120 or the LLM 305 manipulating the real-time syslog events 335 into a format readable by the LLM 305. For example, the real-time syslog events 335 may include one or more syslog events 345 (e.g., a syslog event 345-*a*, a syslog event 345-*b*, a syslog event 345-*c*, a syslog event 345-*d*, and a syslog event 345-*e*) which may be received by the identity management system 120 in a sequential manner. In some examples, the sequential manner for the one or more syslog events 345 associated with a successful request from a user of the identity management system 120 may be as follows. The sequential series of events for the one or more syslog events 345 may start with a session start syslog event (e.g., user.session.start) which may be followed by one or more authentication and evaluation syslog events 345 (e.g., security.internal.authentication, user.authentication.sso, policy.evaluate_sign_on, user.authentication.auth_via_mfa, and user.authentication.auth_via_AD_agent). The one or more authentication and evaluation syslog events 345 may be followed by one or more verification syslog events 345 (e.g., user.authentication.verify, system.push.send_factor_verify_push, system.sms.send_factor_verify_message, and system.email.send_factor_verify_message) before a user is granted access to an account. If the authentication of the user is verified the user may then be granted access to the one or more applications of the identity management system 120.

In some examples, the one or more syslog events 345 may also include one or more fields which indicate information for the LLM 305 to use. For, a respective syslog event may have fields that indicate an event type, an IP address, a device token, a country of origin, a risk level, a behavior signal, among others. However, the LLM 305 may be unable to use the one or more syslog events 345 directly to generate the user risk score 340. As such, the identity management system 120 or the LLM 305 may manipulate the one or more syslog events 345 into a set of text strings that includes the one or more fields of the respective syslog event 345. That is, the LLM 305 may use the set of text strings associated with the one or more syslog events 345 as an input opposed to using the one or more syslog events 345 directly. To convert the one or more syslog events 345 into the set of text strings, the identity management system 120, the LLM 305, or both may perform text parsing 350 on the one or more syslog events 345. That is, the text parsing 350 may convert the one or more syslog events 345 into the set of text strings.

In some examples, the text parsing 350 performed by the identity management system 120 or the LLM 305 may also include additional manipulation of the one or more syslog events 345. For example, there may be one or more fields that may be irrelevant to the LLM 305 when determining the user risk score 340. As such, the text parsing 350 may eliminate some of the fields of the one or more syslog events 345 to enhance the readability of the set of text strings at the LLM 305. The LLM 305 may then implement a transformer 355 to generate the user risk score 340. The transformer 355 may be a machine learning architecture that is a type of neural network that uses a self-attention mechanism, positional embeddings, and multi-head attention. The self-attention mechanism may enable the LLM 305 to detect connections between different elements such as the fields of the one or more syslog events 345. Further, the positional embeddings and multi-head attention may allow the LLM 305 to perform simultaneous sequential processing on the one or more syslog events 345 to reduce the latency of the execution phase 330 of the LLM 305. As such, based on parsing the one or more syslog events 345 via the text parsing 350 and applying the transformer 355 to the one or more syslog events 345, the LLM 305 may determine the user risk score 340 for a respective user. For example, the transformer 355 may identify patterns within the real-time syslog events 335 that indicate a fraudulent user. As such, the LLM 305 may generate the user risk score 340 for a respective user based on the LLM 305 determining whether a user is a fraudulent user.

Additionally, or alternatively, batch processing may be implemented where the identity management system 120 may configure the LLM 305 to periodically automatically generate the user risk score 340 based on a set length of time or a quantity of syslog events 345. For example, the identity management system 120 may configure the LLM 305 to generate the user risk score 340 periodically (e.g., ever x amount of hours, every day). In some other examples, the identity management system 120 may configure the LLM 305 to generate the user risk score 340 based on a quantity of syslog events 345 associated with a respective user. As such, the identity management system 120 may configure a syslog event 345 quantity threshold where if the quantity of syslog events 345 satisfies or exceeds the syslog event 345 quantity threshold the LLM 305 will automatically perform the execution phase 330 to generate the user risk score 340. For example, the LLM 305 may be incapable of generating an accurate user risk score 340 based on a single syslog event 345, however, the LLM 305 may be capable of generating an accurate user risk score 340 off of 10 or more syslog events 345. In another example, the identity management system 120 may configure the LLM 305 to generate the user risk score 340 based on the identity management system 120 receiving a type of syslog event 345. For example, the identity management system 120 may receive a syslog event 345 indicating that the authorization for a user has been verified. As such, the LLM 305 may be triggered to automatically generate the user risk score 340 based on the identity management system 120 receiving the configured type of syslog event 345. In some cases, as an enhanced security procedure, the LLM 305 may also be configured to generate the user risk score 340 in real-time, before the identity management system 120 grants access to the respective user as to prevent the fraudulent user from being granted access to the identity management system 120.

As such, the identity management system 120 may be capable of using the LLM 305 to generate the user risk score 340 for a respective user to determine if the respective user is a fraudulent user. By performing the techniques of the present disclosure as described herein, including with reference to the LLM diagram 300, the identity management system 120 may be capable of providing a more secure and reliable connection for users of the identity management system 120. Further descriptions of the techniques of the present disclosure may be described elsewhere herein, including with reference to FIG. 4.

Figure 4:
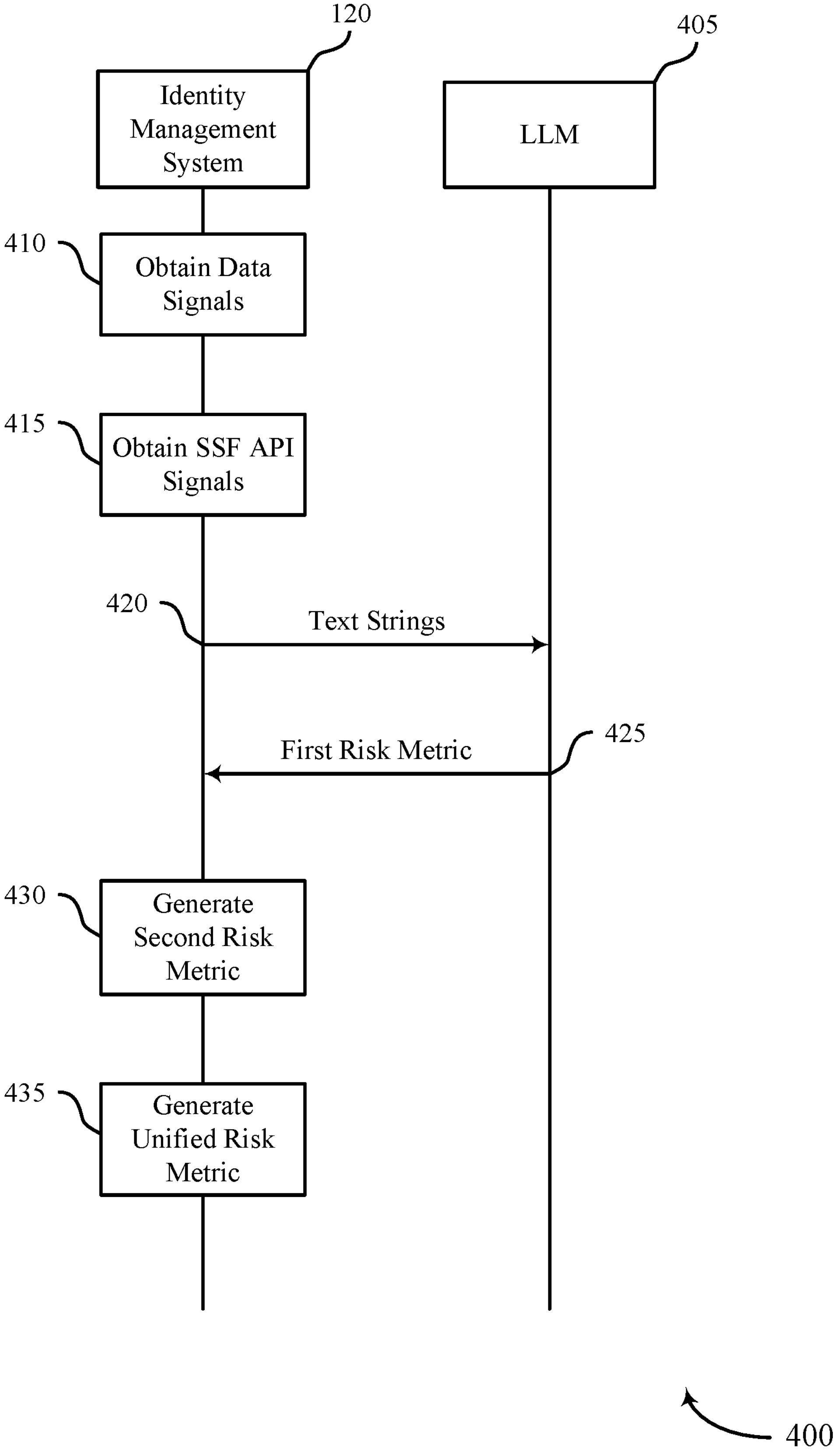
FIG. 4 shows an example of a process flow that supports a signal source framework for user risk mitigation in accordance with aspects of the present disclosure.

FIG. 4 shows an example of a process flow 400 that supports a signal source framework for user risk mitigation in accordance with aspects of the present disclosure. In some examples, the process flow 400 may be implemented by or may implement the computing system 100, the identity management system diagram 200 and/or the LLM diagram 300. For example, the process flow 400 may include the identity management system 120 and an LLM 405, which may be examples of devices or services described with reference to FIGS. 1 through 3.

In the following description of the process flow 400, operations between the identity management system 120 and the LLM 405 may be performed in different orders or at different times. Some operations may also be left out of the process flow 400, or other operations may be added. Although the identity management system 120 and the LLM 405 are shown performing the operations of the process flow 400, some aspects of the operations depicted in the example of FIG. 4 may also be performed by one or more other devices, services, or models described elsewhere herein, including with reference to FIG. 1.

At 410, the identity management system 120 may obtain, via a syslog API of the identity management system 120, a set of data signals associated with interactions between a user of a client device (e.g., a computing device 105) and one or more applications (e.g., applications 110) associated with the identity management system 120. At 415, the identity management system 120 may obtain, from one or more ESS (e.g., applications connected to the identity management system 120) via an SSF API, a set of SSF signals associated with interactions between the user of the client device and the one or more third-party applications. Further, the set of data signals may include first-party data extracted by one or more internal security services and third-party data provided by one or more external services (such as the ESS 204). In some examples, the set of data signals may also include real-time event-based data signals ingested via the syslog API of the identity management system 120.

At 420, the identity management system 120 may output, to at least one LLM 405 affiliated with a multi-modal machine learning model, a set of text strings that include parsed data from the set of data signals obtained via the syslog API. Further, the LLM 405 may be configured to generate risk metrics based on the set of data signals captured or obtained via the syslog API of the identity management system 120. In some examples, the identity management system 120 may use historical data signals captured, obtained, or received by the syslog API and auxiliary network security data to train the LLM 405 that is affiliated with the multi-modal machine learning model. In some other examples, the identity management system 120 may configure the at least one LLM 405 to perform user risk classification by applying transfer learning to the at least one LLM 405.

At 425, the identity management system 120 may obtain, from the at least one LLM 405 affiliated with the multi-modal machine learning model, a first risk metric associated with the interactions between the user of the client device and the one or more applications associated with the identity management system 120. In some examples, the identity management system 120 may obtain the first risk metric based on the identity management system 120 training the LLM 405. In some other examples, the first risk metric may be a result of the user risk classification performed by the LLM 405. Further, in some cases, the first risk metric may be based on one or more parameters. For example, the identity management system 120 may generate the first risk metric based on a geolocation of the user, an IP address of the client device, a user agent, a device identifier of the client device, a device type of the client device, user activity logging data associated with the interactions between the client device and the one or more applications, authentication event data associated with the interactions, fingerprint information associated with the user, system log information captured by the system log API, or any combination thereof. Additionally, or alternatively, the first risk metric may be based on a sequence of event patterns in the set of text strings that contain the parsed data from the set of data signals.

At 430, the identity management system 120 may generate, by a risk combinator of the multi-modal machine learning model, at least one second risk metric associated with the client device. In some examples, the identity management system 120 may generate the second risk metric based on one or more parameters. For example, the identity management system 120 may generate the second risk metric based on an operating system of the client device, a sensor configuration of the client device, a set of internet settings associated with the client device, a firewall status of the client device, automatic update settings of the client device, an antivirus setting of the client device, a security center service of the client device, a user account control of the client device, user risk information provided by one or more third-party data sources, or any combination thereof. In some examples, to generate the second risk metric, the identity management system 120 may compute a normalized Euclidean distance between a reference vector and a signal vector corresponding to a subset of the set of data signals obtained via the syslog API of the identity management system 120. As such, the second risk metric may include the normalized Euclidean distance.

At 435, the identity management system 120 may generate, a unified risk metric associated with the user of the client device. The identity management system 120 may generate the unified risk metric based on both the first risk metric obtained from the at least one LLM 405 and the at least one second risk metric generated by the risk combinator. In some examples, to generate the unified risk metric the identity management system 120 may combine the first risk metric obtained from the at least one LLM 405 with the at least one second risk metric generated by the risk combinator of the multi-modal machine learning model (for example, using the multi-modal machine learning model, AND/OR rules, or both).

Figure 5:
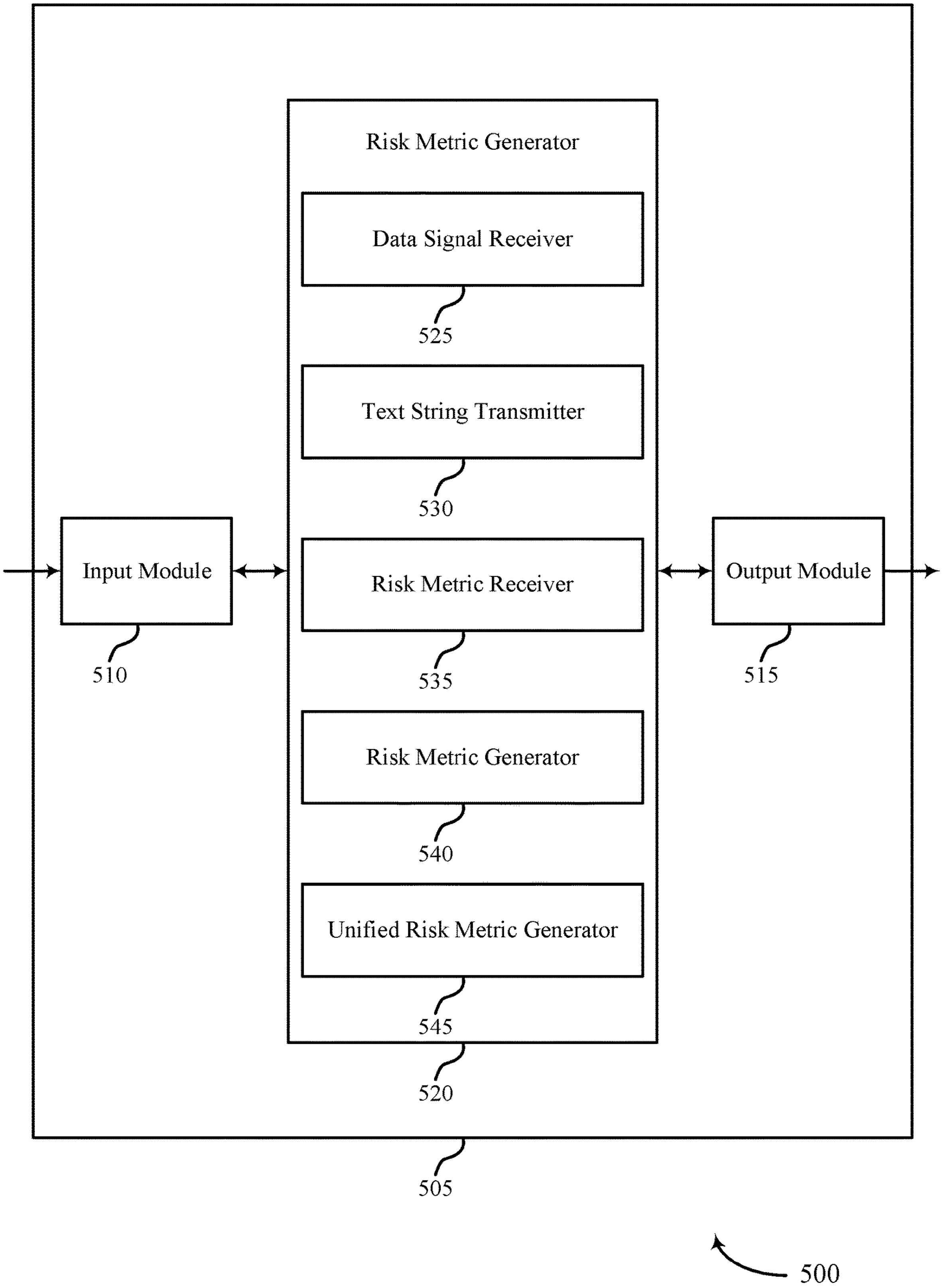
FIG. 5 shows a block diagram of an apparatus that supports a signal source framework for user risk mitigation in accordance with aspects of the present disclosure.

FIG. 5 shows a block diagram 500 of a device 505 associated with an identity management system that supports a signal source framework for user risk mitigation in accordance with aspects of the present disclosure. The device 505 may include an input module 510, an output module 515, and a risk metric generator 520. The device 505, or one or more components of the device 505 (e.g., the input module 510, the output module 515, and the risk metric generator 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the risk metric generator 520 to support signal source framework for user risk mitigation. In some cases, the input module 510 may be a component of an input/output (I/O) controller 710, as described with reference to FIG. 7.

The output module 515 may manage output signals for the device 505. For example, the output module 515 may receive signals from other components of the device 505, such as the risk metric generator 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710, as described with reference to FIG. 7.

For example, the risk metric generator 520 may include a data signal receiver 525, a text string transmitter 530, a risk metric receiver 535, a risk metric generator 540, a unified risk metric generator 545, or any combination thereof. In some examples, the risk metric generator 520, or various components thereof, may be configured to perform various operations (e.g., receiving, monitoring, transmitting) using or otherwise in cooperation with the input module 510, the output module 515, or both. For example, the risk metric generator 520 may receive information from the input module 510, send information to the output module 515, or be integrated in combination with the input module 510, the output module 515, or both to receive information, transmit information, or perform various other operations as described herein.

The risk metric generator 520 may support risk metric generation in accordance with examples disclosed herein. The data signal receiver 525 may be configured to support obtaining, via a system log API of an identity management system, a set of data signals associated with interactions between a user of a client device and one or more applications associated with the identity management system. The text string transmitter 530 may be configured to support outputting, to at least one LLM affiliated with a multi-modal machine learning model that is configured to generate risk metrics based on data signals captured via the system log API of the identity management system, a set of text strings including parsed data from the set of data signals obtained via the system log API. The risk metric receiver 535 may be configured to support obtaining, from the at least one LLM affiliated with the multi-modal machine learning model, a first risk metric associated with the interactions between the user of the client device and the one or more applications associated with the identity management system. The risk metric generator 540 may be configured to support generating, by a risk combinator of the multi-modal machine learning model, at least one second risk metric associated with the client device. The unified risk metric generator 545 may be configured to support generating, by the identity management system, a unified risk metric associated with the user of the client device based on the first risk metric obtained from the at least one LLM and the at least one second risk metric generated by the risk combinator.

Figure 6:
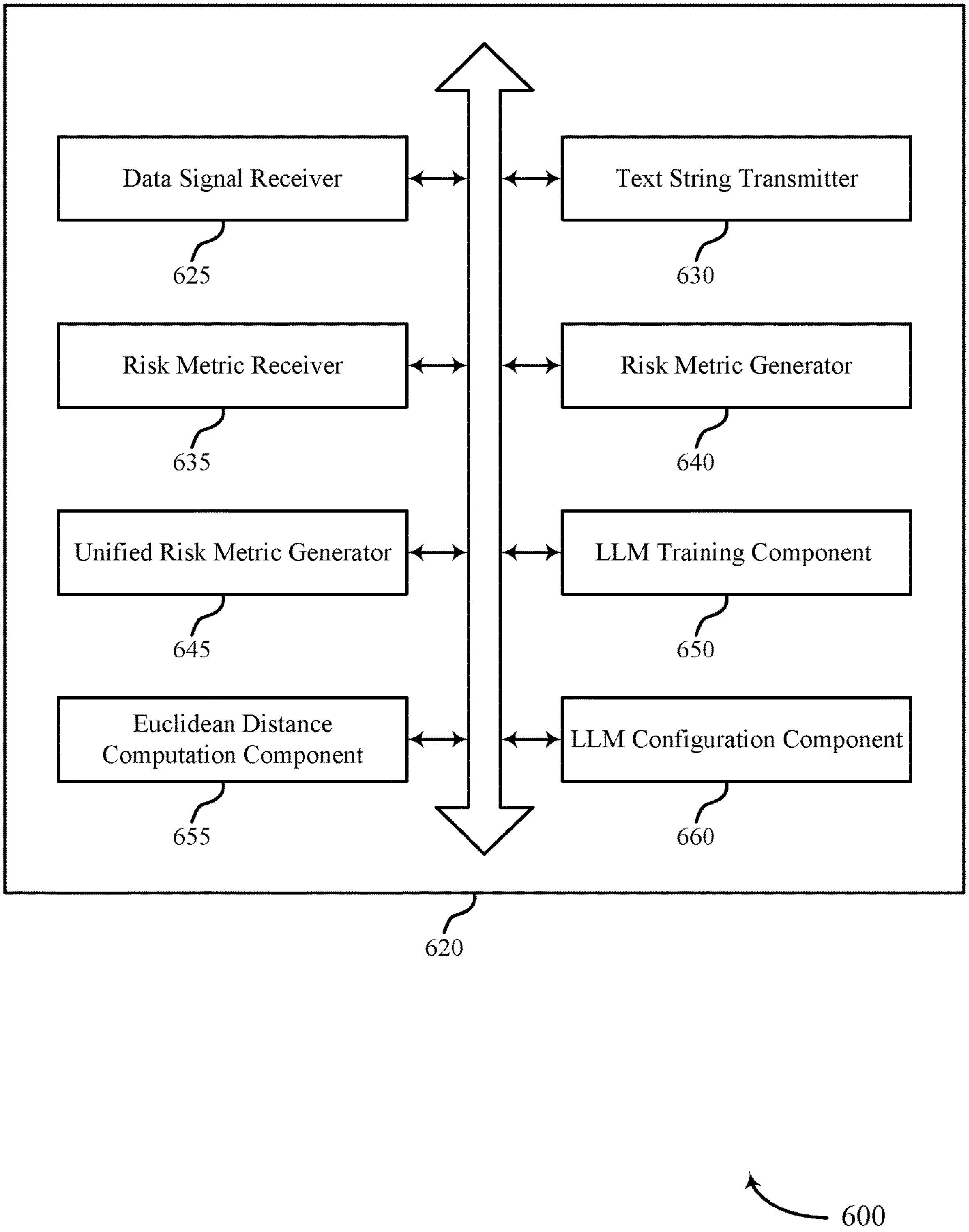
FIG. 6 shows a block diagram of a risk metric generator that supports a signal source framework for user risk mitigation in accordance with aspects of the present disclosure.

FIG. 6 shows a block diagram 600 of a risk metric generator 620 that supports a signal source framework for user risk mitigation in accordance with aspects of the present disclosure. The risk metric generator 620 may be an example of aspects of a risk metric generator 520, as described herein. The risk metric generator 620, or various components thereof, may be an example of means for performing various aspects of a signal source framework for user risk mitigation, as described herein. For example, the risk metric generator 620 may include a data signal receiver 625, a text string transmitter 630, a risk metric receiver 635, a risk metric generator 640, a unified risk metric generator 645, an LLM training component 650, a Euclidean distance computation component 655, an LLM configuration component 660, or any combination thereof. Each of these components, or components of subcomponents thereof (e.g., one or more processors, one or more memories), may communicate, directly or indirectly, with one another (e.g., via one or more buses).

The risk metric generator 620 may support risk metric generation in accordance with examples disclosed herein. The data signal receiver 625 may be configured to support obtaining, via a system log API of an identity management system, a set of data signals associated with interactions between a user of a client device and one or more applications associated with the identity management system. The text string transmitter 630 may be configured to support outputting, to at least one LLM affiliated with a multi-modal machine learning model that is configured to generate risk metrics based on data signals captured via the system log API of the identity management system, a set of text strings including parsed data from the set of data signals obtained via the system log API. The risk metric receiver 635 may be configured to support obtaining, from the at least one LLM affiliated with the multi-modal machine learning model, a first risk metric associated with the interactions between the user of the client device and the one or more applications associated with the identity management system. The risk metric generator 640 may be configured to support generating, by a risk combinator of the multi-modal machine learning model, at least one second risk metric associated with the client device. The unified risk metric generator 645 may be configured to support generating, by the identity management system, a unified risk metric associated with the user of the client device based on the first risk metric obtained from the at least one LLM and the at least one second risk metric generated by the risk combinator.

In some examples, the LLM training component 650 may be configured to support using historical data signals captured by the system log API and auxiliary network security data to train the LLM affiliated with the multi-modal machine learning model, where obtaining the first risk metric is based on training the LLM.

In some examples, the first risk metric is based on a geolocation of the user, an IP address of the client device, a user agent, a device identifier of the client device, a device type of the client device, user activity logging data associated with the interactions between the client device and the one or more applications, authentication event data associated with the interactions, fingerprint information associated with the user, system log information captured by the system log API, or any combination thereof.

In some examples, the second risk metric is based on an operating system of the client device, a sensor configuration of the client device, a set of internet settings associated with the client device, a firewall status of the client device, automatic update settings of the client device, an antivirus setting of the client device, a security center service of the client device, a user account control of the client device, user risk information provided by one or more third-party data sources, or any combination thereof.

In some examples, the set of data signals include first-party data extracted by one or more internal security services and third-party data provided by one or more ESS.

In some examples, the Euclidean distance computation component 655 may be configured to support computing a normalized Euclidean Distance between a reference vector and a signal vector corresponding to a subset of the set of data signals obtained via the system log API of the identity management system, where the second risk metric includes the normalized Euclidean Distance.

In some examples, the set of data signals include first-party data extracted by one or more internal security services and third-party data provided by one or more ESS.

In some examples, the first risk metric is based on a sequence of event patterns in the set of text strings containing parsed data from the set of data signals. In some examples, the set of data signals include real-time event-based data signals ingested via the system log API of the identity management system.

In some examples, to support generating the unified risk metric, the unified risk metric generator 645 may be configured to support combining the first risk metric obtained from the at least one LLM with the at least one second risk metric generated by the risk combinator of the multi-modal machine learning model.

In some examples, the LLM configuration component 660 may be configured to support configuring the at least one LLM to perform user risk classification by applying transfer learning to the at least one LLM, where the first risk metric is a result of the user risk classification.

Figure 7:
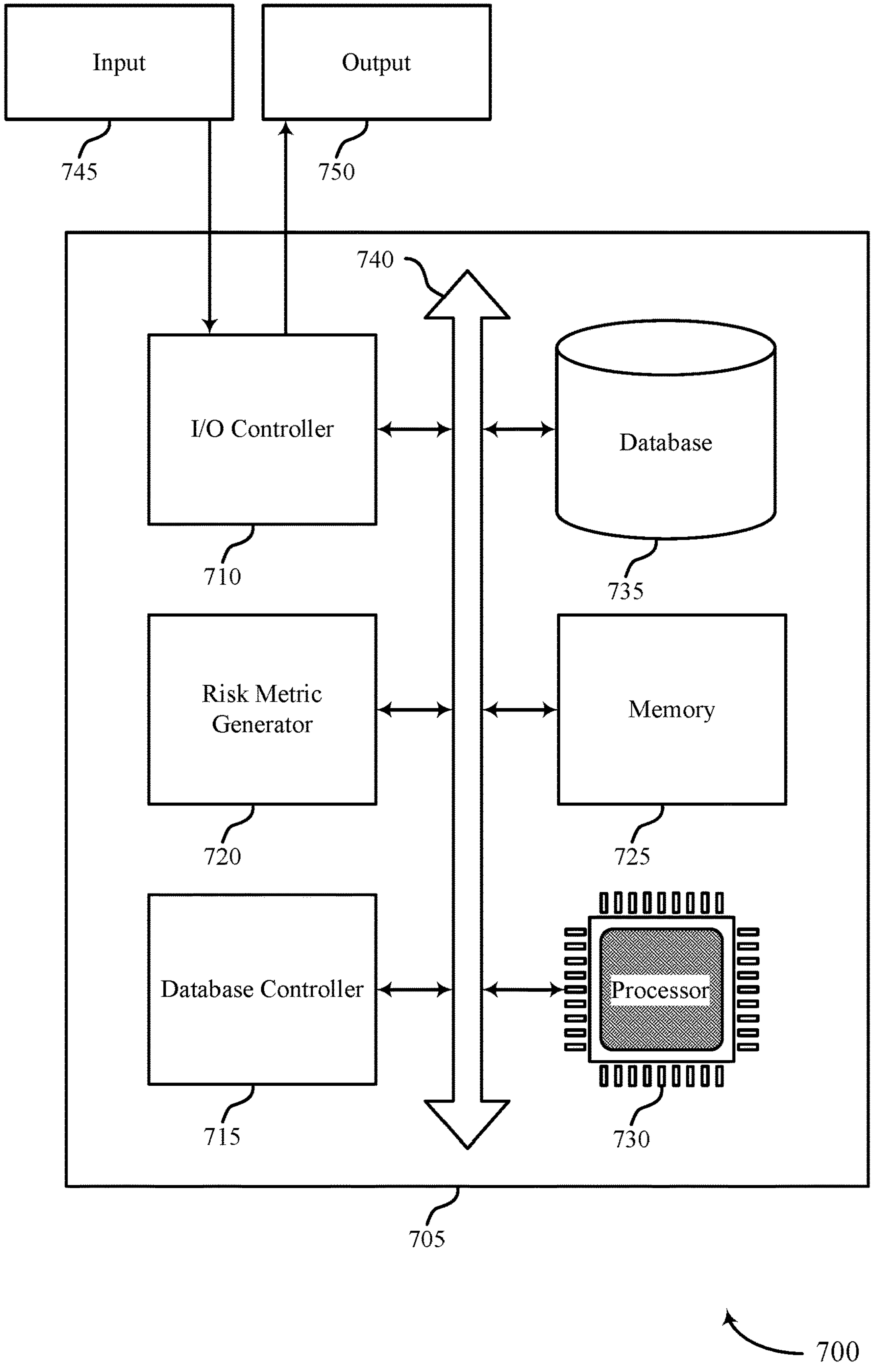
FIG. 7 shows a diagram of a system including a device that supports a signal source framework for user risk mitigation in accordance with aspects of the present disclosure.

FIG. 7 shows a diagram of a system 700 including a device 705 associated with an identity management system that supports a signal source framework for user risk mitigation in accordance with aspects of the present disclosure. The device 705 may be an example of or include the components of a device 505, as described herein. The device 705 may include components for bi-directional voice and data communications including components for transmitting and receiving communications, such as a risk metric generator 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting signal source framework for user risk mitigation). The processor 730 may be an example of a single processor or multiple processors. For example, the device 705 may include one or more processors 730.

The risk metric generator 720 may support risk metric generation in accordance with examples as disclosed herein. For example, the risk metric generator 720 may be configured to support obtaining, via a system log API of an identity management system, a set of data signals associated with interactions between a user of a client device and one or more applications associated with the identity management system. The risk metric generator 720 may be configured to support outputting, to at least one LLM affiliated with a multi-modal machine learning model that is configured to generate risk metrics based on data signals captured via the system log API of the identity management system, a set of text strings including parsed data from the set of data signals obtained via the system log API. The risk metric generator 720 may be configured to support obtaining, from the at least one LLM affiliated with the multi-modal machine learning model, a first risk metric associated with the interactions between the user of the client device and the one or more applications associated with the identity management system. The risk metric generator 720 may be configured to support generating, by a risk combinator of the multi-modal machine learning model, at least one second risk metric associated with the client device. The risk metric generator 720 may be configured to support generating, by the identity management system, a unified risk metric associated with the user of the client device based on the first risk metric obtained from the at least one LLM and the at least one second risk metric generated by the risk combinator.

By including or configuring the risk metric generator 720 in accordance with examples as described herein, the device 705 may enable the identity management system 120 to generate a user risk metric for a respective user, thereby promoting improved trust of the identity management system 120, improved communication reliability, improved user experience, and greater system security.

Figure 8:
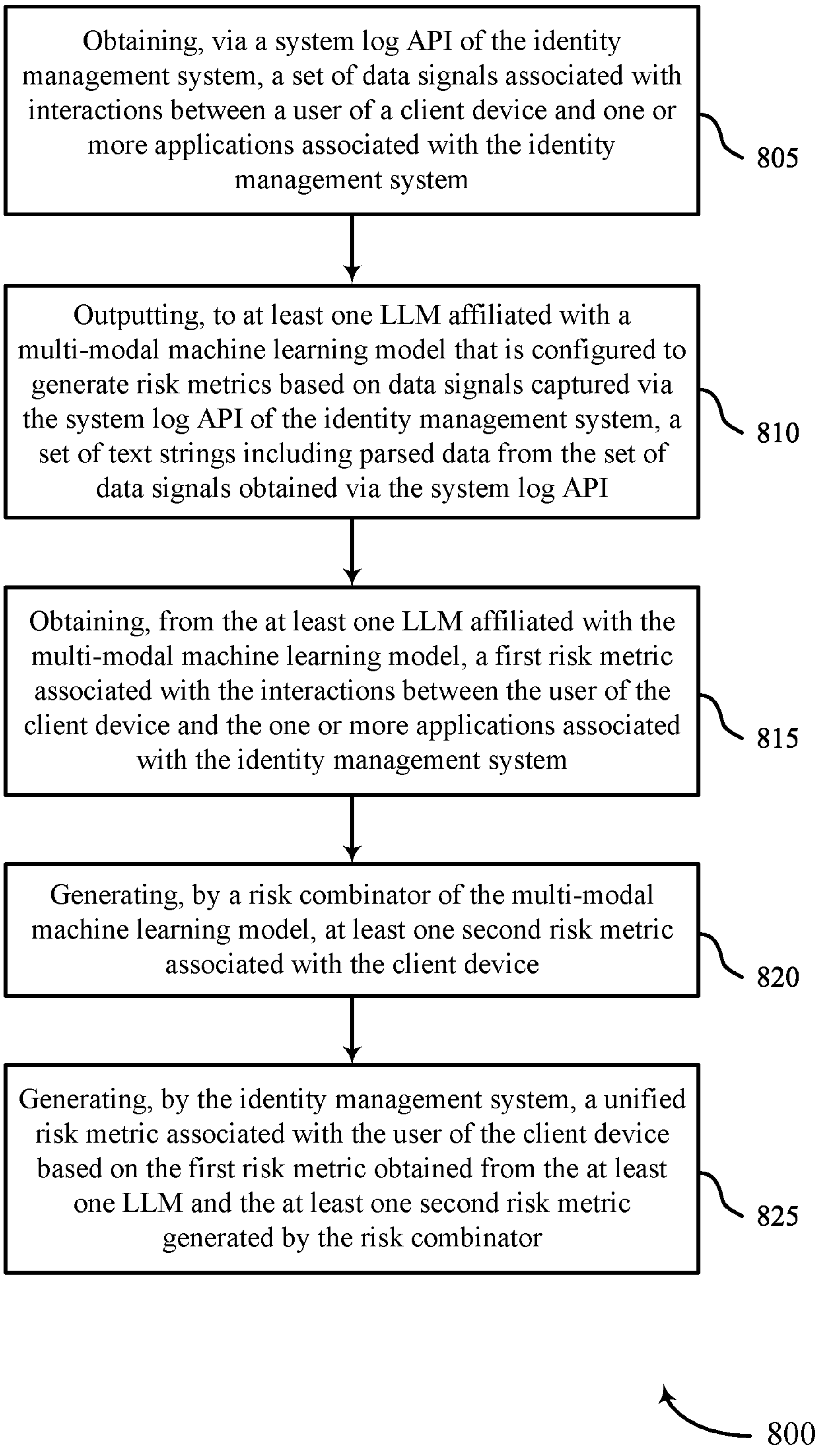
FIG. 8 shows a flowchart illustrating methods that support signal source framework for user risk mitigation in accordance with aspects of the present disclosure.

FIG. 8 shows a flowchart illustrating a method 800 that supports a signal source framework for user risk mitigation in accordance with aspects of the present disclosure. The operations of the method 800 may be implemented by an identity management system or components thereof. For example, the operations of the method 800 may be performed by an identity management system 120, as described with reference to FIGS. 1 through 7. In some examples, the identity management system may execute a set of instructions to control the functional elements of the identity management system to perform the described functions. Additionally, or alternatively, the identity management system may perform aspects of the described functions using special-purpose hardware.

At 805, the method may include obtaining, via a system log API of the identity management system, a set of data signals associated with interactions between a user of a client device and one or more applications associated with the identity management system. In some examples, aspects of the operations of 805 may be performed by a data signal receiver 625, as described with reference to FIG. 6.

At 810, the method may include outputting, to at least one LLM affiliated with a multi-modal machine learning model that is configured to generate risk metrics based on data signals captured via the system log API of the identity management system, a set of text strings including parsed data from the set of data signals obtained via the system log API. In some examples, aspects of the operations of 810 may be performed by a text string transmitter 630, as described with reference to FIG. 6.

At 815, the method may include obtaining, from the at least one LLM affiliated with the multi-modal machine learning model, a first risk metric associated with the interactions between the user of the client device and the one or more applications associated with the identity management system. In some examples, aspects of the operations of 815 may be performed by a risk metric receiver 635, as described with reference to FIG. 6.

At 820, the method may include generating, by a risk combinator of the multi-modal machine learning model, at least one second risk metric associated with the client device. In some examples, aspects of the operations of 820 may be performed by a risk metric generator 640, as described with reference to FIG. 6.

At 825, the method may include generating, by the identity management system, a unified risk metric associated with the user of the client device based on the first risk metric obtained from the at least one LLM and the at least one second risk metric generated by the risk combinator. In some examples, aspects of the operations of 825 may be performed by a unified risk metric generator 645, as described with reference to FIG. 6.

The Following Provides an Overview of Aspects of the Present Disclosure:

Aspect 1: A method for risk metric generation, comprising: obtaining, via a system log API of an identity management system, a plurality of data signals associated with interactions between a user of a client device and one or more applications associated with the identity management system; outputting, to at least one LLM affiliated with a multi-modal machine learning model that is configured to generate risk metrics based at least in part on data signals captured via the system log API of the identity management system, a set of text strings comprising parsed data from the plurality of data signals obtained via the system log API; obtaining, from the at least one LLM affiliated with the multi-modal machine learning model, a first risk metric associated with the interactions between the user of the client device and the one or more applications associated with the identity management system; generating, by a risk combinator of the multi-modal machine learning model, at least one second risk metric associated with the client device; and generating, by the identity management system, a unified risk metric associated with the user of the client device based at least in part on the first risk metric obtained from the at least one LLM and the at least one second risk metric generated by the risk combinator.

Aspect 2: The method of aspect 1, further comprising: using historical data signals captured by the system log API and auxiliary network security data to train the LLM affiliated with the multi-modal machine learning model, wherein obtaining the first risk metric is based at least in part on training the LLM.

Aspect 3: The method of any of aspects 1 through 2, wherein the first risk metric is based at least in part on a geolocation of the user, an IP address of the client device, a user agent, a device identifier of the client device, a device type of the client device, user activity logging data associated with the interactions between the client device and the one or more applications, authentication event data associated with the interactions, fingerprint information associated with the user, system log information captured by the system log API, or any combination thereof.

Aspect 4: The method of any of aspects 1 through 3, wherein the second risk metric is based at least in part on an operating system of the client device, a sensor configuration of the client device, a set of internet settings associated with the client device, a firewall status of the client device, automatic update settings of the client device, an antivirus setting of the client device, a security center service of the client device, a user account control of the client device, user risk information provided by one or more third-party data sources, or any combination thereof.

Aspect 5: The method of any of aspects 1 through 4, wherein the plurality of data signals include first-party data extracted by one or more internal security services and third-party data provided by one or more ESS.

Aspect 6: The method of any of aspects 1 through 5, further comprising: computing a normalized Euclidean distance between a reference vector and a signal vector corresponding to a subset of the plurality of data signals obtained via the system log API of the identity management system, wherein the second risk metric comprises the normalized Euclidean distance.

Aspect 7: The method of any of aspects 1 through 6, wherein the plurality of data signals include first-party data extracted by one or more internal security services and third-party data provided by one or more ESS.

Aspect 8: The method of any of aspects 1 through 7, wherein the first risk metric is based at least in part on a sequence of event patterns in the set of text strings containing parsed data from the plurality of data signals.

Aspect 9: The method of any of aspects 1 through 8, wherein the plurality of data signals comprise real-time event-based data signals ingested via the system log API of the identity management system.

Aspect 10: The method of any of aspects 1 through 9, wherein generating the unified risk metric comprises: combining the first risk metric obtained from the at least one LLM with the at least one second risk metric generated by the risk combinator of the multi-modal machine learning model.

Aspect 11: The method of any of aspects 1 through 10, further comprising: configuring the at least one LLM to perform user risk classification by applying transfer learning to the at least one LLM, wherein the first risk metric is a result of the user risk classification.

Aspect 12: An apparatus for risk metric generation, comprising one or more memories storing processor-executable code, and one or more processors coupled with the one or more memories and individually or collectively operable to execute the code to cause the apparatus to perform a method of any of aspects 1 through 11.

Aspect 13: An apparatus for risk metric generation, comprising at least one means for performing a method of any of aspects 1 through 11.

Aspect 14: A non-transitory computer-readable medium storing code for risk metric generation, the code comprising instructions executable by at least one processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for risk metric generation, comprising:

obtaining, via a system log application programming interface (API) of an identity management system, a plurality of data signals associated with interactions between a user of a client device and one or more applications associated with the identity management system;

outputting, to at least one large language model (LLM) affiliated with a multi-modal machine learning model that is configured to generate risk metrics based at least in part on data signals captured via the system log API of the identity management system, a set of text strings comprising parsed data from the plurality of data signals obtained via the system log API;

obtaining, from the at least one LLM affiliated with the multi-modal machine learning model, a first risk metric associated with the interactions between the user of the client device and the one or more applications associated with the identity management system;

computing a normalized Euclidean Distance between a reference vector and a signal vector corresponding to a subset of the plurality of data signals obtained via the system log API of the identity management system;

generating, by a risk combinator of the multi-modal machine learning model, at least one second risk metric associated with the client device, wherein the at least one second risk metric comprises the normalized Euclidean Distance; and generating, by the identity management system, a unified risk metric associated with the user of the client device based at least in part on the first risk metric obtained from the at least one LLM and the at least one second risk metric generated by the risk combinator.

2. The method of claim 1, further comprising:

using historical data signals captured by the system log API and auxiliary network security data to train the LLM affiliated with the multi-modal machine learning model, wherein obtaining the first risk metric is based at least in part on training the LLM.

3. The method of claim 1, wherein the first risk metric is based at least in part on a geolocation of the user, an Internet Protocol (IP) address of the client device, a user agent, a device identifier of the client device, a device type of the client device, user activity logging data associated with the interactions between the client device and the one or more applications, authentication event data associated with the interactions, fingerprint information associated with the user, system log information captured by the system log API, or any combination thereof.

4. The method of claim 1, wherein the at least one second risk metric is based at least in part on an operating system of the client device, a sensor configuration of the client device, a set of internet settings associated with the client device, a firewall status of the client device, automatic update settings of the client device, an antivirus setting of the client device, a security center service of the client device, a user account control of the client device, user risk information provided by one or more third-party data sources, or any combination thereof.

5. The method of claim 1, wherein the plurality of data signals include first-party data extracted by one or more internal security services and third-party data provided by one or more external security services.

6. The method of claim 1, wherein the first risk metric is based at least in part on a sequence of event patterns in the set of text strings containing parsed data from the plurality of data signals.

7. The method of claim 1, wherein the plurality of data signals comprise real-time event-based data signals ingested via the system log API of the identity management system.

8. The method of claim 1, wherein generating the unified risk metric comprises:

combining the first risk metric obtained from the at least one LLM with the at least one second risk metric generated by the risk combinator of the multi-modal machine learning model.

9. The method of claim 1, further comprising:

configuring the at least one LLM to perform user risk classification by applying transfer learning to the at least one LLM, wherein the first risk metric is a result of the user risk classification.

10. An apparatus, comprising:

one or more memories storing processor-executable code; and one or more processors coupled with the one or more memories and individually or collectively operable to execute the code to cause the apparatus to:

obtain, via a system log application programming interface (API) of an identity management system, a plurality of data signals associated with interactions between a user of a client device and one or more applications associated with the identity management system;

output, to at least one large language model (LLM) affiliated with a multi-modal machine learning model that is configured to generate risk metrics based at least in part on data signals captured via the system log API of the identity management system, a set of text strings comprising parsed data from the plurality of data signals obtained via the system log API;

obtain, from the at least one LLM affiliated with the multi-modal machine learning model, a first risk metric associated with the interactions between the user of the client device and the one or more applications associated with the identity management system;

compute a normalized Euclidean Distance between a reference vector and a signal vector corresponding to a subset of the plurality of data signals obtained via the system log API of the identity management system;

generating, by a risk combinator of the multi-modal machine learning model, at least one second risk metric associated with the client device, wherein the at least one second risk metric comprises the normalized Euclidean Distance; and generate, by the identity management system, a unified risk metric associated with the user of the client device based at least in part on the first risk metric obtained from the at least one LLM and the at least one second risk metric generated by the risk combinator.

11. The apparatus of claim 10, wherein the one or more processors are individually or collectively further operable to execute the code to cause the apparatus to:

used historical data signals captured by the system log API and auxiliary network security data to train the LLM affiliated with the multi-modal machine learning model, wherein obtaining the first risk metric is based at least in part on training the LLM.

12. The apparatus of claim 10, wherein, to generate the unified risk metric, the one or more processors are individually or collectively operable to execute the code to cause the apparatus to:

combine the first risk metric obtained from the at least one LLM with the at least one second risk metric generated by the risk combinator of the multi-modal machine learning model.

13. The apparatus of claim 10, wherein the one or more processors are individually or collectively further operable to execute the code to cause the apparatus to:

configure the at least one LLM to perform user risk classification by applying transfer learning to the at least one LLM, wherein the first risk metric is a result of the user risk classification.

14. A non-transitory computer-readable medium storing code for risk metric generation, the code comprising instructions executable by one or more processors to:

obtain, via a system log application programming interface (API) of an identity management system, a plurality of data signals associated with interactions between a user of a client device and one or more applications associated with the identity management system;

output, to at least one large language model (LLM) affiliated with a multi-modal machine learning model that is configured to generate risk metrics based at least in part on data signals captured via the system log API of the identity management system, a set of text strings comprising parsed data from the plurality of data signals obtained via the system log API;

obtain, from the at least one LLM affiliated with the multi-modal machine learning model, a first risk metric associated with the interactions between the user of the client device and the one or more applications associated with the identity management system;

compute a normalized Euclidean Distance between a reference vector and a signal vector corresponding to a subset of the plurality of data signals obtained via the system log API of the identity management system;

generate, by a risk combinator of the multi-modal machine learning model, at least one second risk metric associated with the client device, wherein the at least one second risk metric comprises the normalized Euclidean Distance; and generate, by the identity management system, a unified risk metric associated with the user of the client device based at least in part on the first risk metric obtained from the at least one LLM and the at least one second risk metric generated by the risk combinator.

15. The non-transitory computer-readable medium of claim 14, wherein the instructions are further executable by the one or more processors to:

used historical data signals captured by the system log API and auxiliary network security data to train the LLM affiliated with the multi-modal machine learning model, wherein obtaining the first risk metric is based at least in part on training the LLM.

16. The non-transitory computer-readable medium of claim 14, wherein the instructions to generate the unified risk metric are executable by the one or more processors to:

combine the first risk metric obtained from the at least one LLM with the at least one second risk metric generated by the risk combinator of the multi-modal machine learning model.

17. The non-transitory computer-readable medium of claim 14, wherein the instructions are further executable by the one or more processors to:

configure the at least one LLM to perform user risk classification by applying transfer learning to the at least one LLM, wherein the first risk metric is a result of the user risk classification.

* * * * *